US 10,774,877 B2

(12) United States Patent
Nebbia Colomba et al.

(10) Patent No.: US 10,774,877 B2
(45) Date of Patent: Sep. 15, 2020

(54) BEARING UNIT FOR AGRICULTURAL USE

(71) Applicant: Aktiebolaget SKF, Gothenburg (SE)

(72) Inventors: Alessio Nebbia Colomba, Viareggio (IT); Fausto Baracca, Massa (IT); Fabio Falaschi, Carrara (IT)

( * ) Notice: Subject to any disclaimer, the term of this patent is extended or adjusted under 35 U.S.C. 154(b) by 0 days.

(21) Appl. No.: 16/121,796

(22) Filed: Sep. 5, 2018

(65) Prior Publication Data
US 2019/0085905 A1 Mar. 21, 2019

(30) Foreign Application Priority Data

Sep. 18, 2017 (IT) .............................. 102017000103856

(51) Int. Cl.
| F16C 33/80 | (2006.01) |
| F16C 33/78 | (2006.01) |
| F16C 35/04 | (2006.01) |
| F16C 19/16 | (2006.01) |
| F16C 19/06 | (2006.01) |

(52) U.S. Cl.
CPC .............. *F16C 33/80* (2013.01); *F16C 19/16* (2013.01); *F16C 33/7826* (2013.01); *F16C 33/7853* (2013.01); *F16C 33/7863* (2013.01); *F16C 33/7886* (2013.01); *F16C 33/7889* (2013.01); *F16C 33/7896* (2013.01); *F16C 35/045* (2013.01); *F16C 19/06* (2013.01); *F16C 2310/00* (2013.01)

(58) Field of Classification Search
CPC ........ F16C 33/80; F16C 33/805; F16C 19/16; F16C 2310/00
See application file for complete search history.

(56) References Cited

U.S. PATENT DOCUMENTS

| 3,813,102 | A | 5/1974 | Derman | |
| 6,619,851 | B2 * | 9/2003 | Vogelgesang | A01D 69/12 384/475 |
| 9,538,697 | B2 * | 1/2017 | Ciulla | A01B 71/04 |
| 9,581,202 | B2 * | 2/2017 | Smith | F16C 19/06 |
| 2005/0238271 | A1 * | 10/2005 | Schafer | A01D 69/12 384/460 |
| 2016/0031261 | A1 * | 2/2016 | Ciulla | B60B 27/0073 384/484 |
| 2017/0016482 | A1 * | 1/2017 | Sakaguchi | F16C 35/063 |

FOREIGN PATENT DOCUMENTS

EP 2946648 11/2015

OTHER PUBLICATIONS

Search Report and Written Opinion of corresponding Italian Application No. 201700103856 dated Jun. 27, 2018.

* cited by examiner

Primary Examiner — Phillip A Johnson
(74) Attorney, Agent, or Firm — Reed Smith LLP

(57) ABSTRACT

A bearing unit for agricultural use, the bearing unit comprising: a rolling bearing, a housing body for the rolling bearing, and a sealing device for preventing the entry into the rolling bearing of contaminants. The sealing device in turn having, at least on one side of the rolling bearing, a first sealing level defined by at least one sliding-contact sealing lip and a second sealing level arranged in series with the first sealing level along an axis of symmetry of the rolling bearing. The sealing device defining a labyrinth for preventing the entry of contaminants into the first sealing level.

4 Claims, 2 Drawing Sheets

BEARING UNIT FOR AGRICULTURAL USE

CROSS-REFERENCE TO PRIORITY APPLICATIONS

This application claims priority to Italian patent application no. 102017000103856 filed on Sep. 18, 2017, the contents of which are fully incorporated herein by reference.

FIELD OF THE PRESENT INVENTION

The present invention relates to a bearing unit for agricultural use, in particular the bearing unit is mounted on an agricultural disc for spreading seeds over agricultural land.

BACKGROUND

Known bearing units, in their more general configuration, comprise a rolling bearing provided with an outer ring, an inner ring defining together with the outer ring an interspace, a row of rolling elements arranged inside the interspace in order to allow the relative rotation of the outer ring and the inner ring, and a housing body inside which the rolling bearing is housed and which is provided with a radial flange for connection to the bearing unit of a respective agricultural disc.

Moreover, the rolling bearing is also provided, on both its axial sides, with two sealing devices, which are designed to prevent the entry, into the rolling bearing, of contaminants (mud, straw, sand, grit, etc.) and are usually composed of a metal support, joined together with one of the two rings so as to extend at least partly inside the interspace, and one or more sealing lips which are made of rubbery material and which, fixed to the metal support, make sliding contact or not with the other ring.

It is well known that agricultural applications represent one of the most aggressive environments for rolling bearing units in particular owing to the nature and the diversity of the possible contaminants. Therefore, in order to safeguard as far as possible the working life of the rolling bearings which, however, still remains one of the shortest in the sector, the sealing devices have been increasingly improved, made more sophisticated and their capacity increased by increasing the number of sealing lips or modifying their configuration or by increasing also the number of metal supports provided with lips fixing them to either one of the two rings of the rolling bearings. All these solutions hitherto, if, on the one hand, they have proved to be useful by increasing the working life of the rolling bearings, on the other hand, have resulted not only in an increase in the complexity of the bearing units for agricultural use, with a consequent increase in the production time, but also in an increase in the production costs.

BRIEF SUMMARY OF THE PRESENT INVENTION

The object of the present invention is to provide a bearing unit for agricultural use which, while ensuring an optimum external insulation and sealing capacity in respect of contaminants, may be produced in a simple and low-cost manner.

According to the present invention a bearing unit for agricultural use which has the characteristic features set forth in the attached claims is provided.

BRIEF DESCRIPTION OF THE DRAWINGS

The invention will now be described with reference to the attached drawings which illustrate a non-limiting example of embodiment thereof, in which.

DETAILED DESCRIPTION OF THE PRESENT INVENTION

Figure 1:
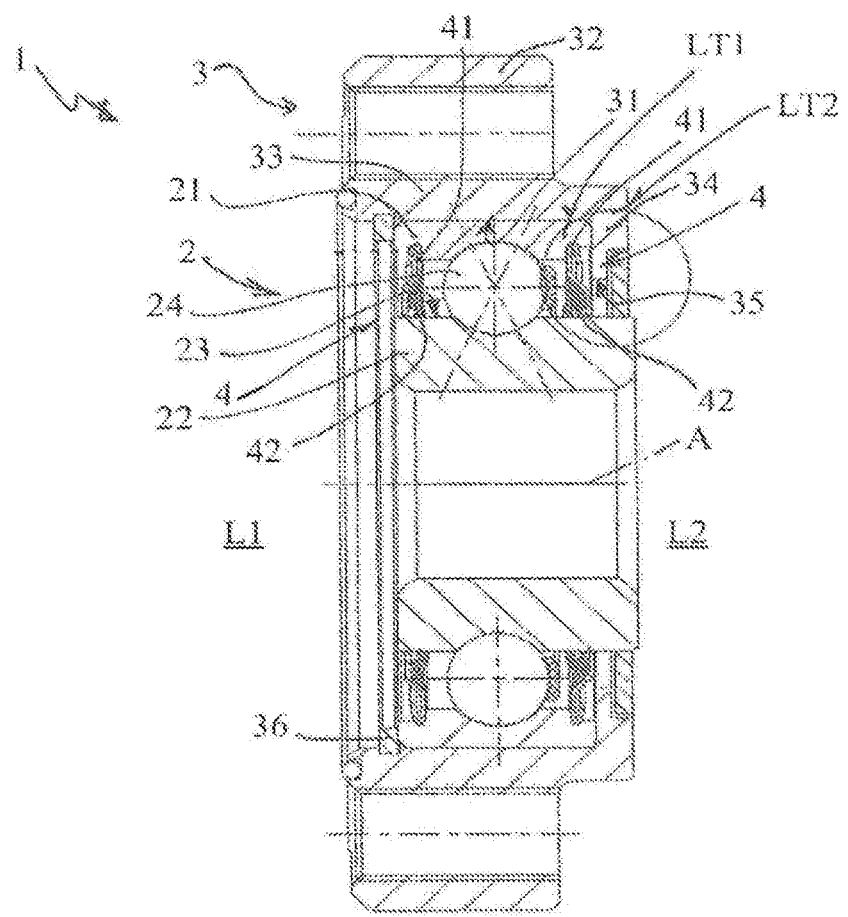
FIG. 1 presents a cross-sectional view of a bearing unit for agricultural use according to a preferred embodiment of the present invention.
Figure 2:
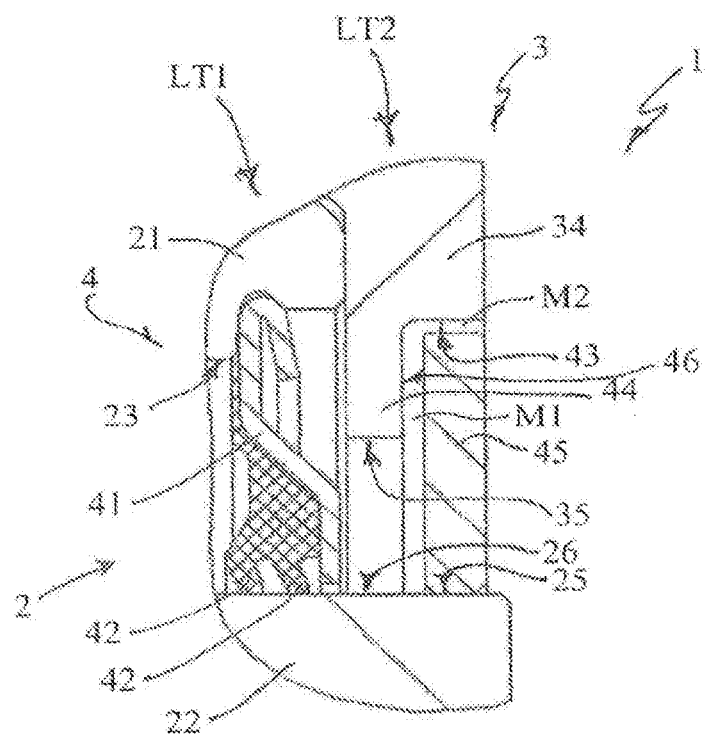
FIG. 2 presents a cross-sectional view and on a larger scale, a detail of the bearing unit for agricultural use according to FIG. 1, the detailed region identified by a circle in FIG. 1.

With reference to FIG. 1, reference character 1 denotes in its entirety a bearing unit for agricultural use mounted, during use, on an agricultural disc (known and not shown).

The bearing unit 1 has an axis of symmetry A and comprises a rolling bearing 2 provided with an outer ring 21 and an inner ring 22, defining between them an interspace 23, and with a row 24 of rolling elements which, in the preferred example of embodiment illustrated here, are balls, the row 24 being arranged inside the interspace 23 so as to allow the relative rotation of the outer ring 21 with respect to the inner ring 22.

The bearing unit 1 comprises, moreover, a housing body 3 which comprises an inner cylindrical seat 31 for housing the rolling bearing 2 and is provided with an outer radial flange 32 for connecting the bearing unit 1 on one side L1 of the bearing unit 1 itself to the agricultural disc.

According to the present invention, the housing body 3 comprises in turn:
an intermediate cylindrical ring 33 from which the flange 32 extends radially outwards and which delimits radially outwards the inner cylindrical seat 31; and
an edge 34 folded-over radially towards the axis of symmetry A, axially delimiting on the opposite side to the side L1 the inner cylindrical seat 31 and defining a circular opening 35 around the axis of symmetry A.

The bearing 2 is axially inserted inside the intermediate cylindrical ring 33 from the side L1 and is arranged so as to bear axially with its outer ring 21 against the folded-over edge 34 which therefore acts as an axial shoulder for locking the outer ring 21. An elastic ring 36 is inserted inside the inner cylindrical seat 31 against the outer ring 21 completing the axial locking of the outer ring 21, permanently joining together the housing body 3 and the bearing 2. Moreover, the inner ring 22 has an axial length that is greater than an axial length of the outer ring 21. The inner ring 22 extends towards the side L2, well beyond the edge 34 and outside of the opening 35. The inner ring 22 together with the folded-over edge 34 and with the inner ring's 22 own outer cylindrical surface 25 form a further interspace 26 having radial dimensions which are in any case smaller than the radial dimensions of the interspace 23.

The bearing unit 1 comprises finally a sealing device 4 for preventing entry of contaminants such as mud, straw, sand, grit, etc. into the rolling bearing 2. In turn comprising both on the side L1 and on a side L2 opposite to the side L1 with respect to the rolling bearing 2 or, depending on the technical necessities, also only on the side L2, a support 41 made of metallic material and joined together with the outer ring 21 so as to extend at least partly inside the interspace 23, and at least one sealing lip 42, made of a rubbery material, fixed to the metal support 41 and making sliding contact with the inner ring 22. In the example shown, the sealing device 4 has a metal support 41 and a sealing lip 42 on both sides L1 and L2; moreover, on the side L2, the sealing device 4 has a second sealing lip 42 which is also made of the rubbery material and is fixed to the metal support 41 and makes sliding contact with the inner ring 22.

For each side L1 and L2, each metal support 41 and the associated sealing lip(s) 42 described above define for the sealing device 4 a first sealing level LT1, which is arranged substantially inside the interspace 23 in a position directly facing the row 24 of rolling elements so as to prevent any entry of contaminants inside the bearing 2. Since, as already mentioned, the bearing unit 1 according to the present invention is used in applications in the agricultural sector and since this sector represents one of the most aggressive environments for the bearing units 1 in particular because of the nature and the diversity of the possible contaminants, the sealing device 4 comprises, moreover, at least on the side L2, a second sealing level LT2, which is arranged axially in series with the first level LT1 along the axis of symmetry A of the bearing 2 and increases in fact the sealing and insulation capacity of the sealing device 4.

Contrary to the first sealing level LT1 where the sealing capacity is based on the mainly sliding-contact action of the sealing lips 42, in the case of the second sealing level LT2, in order to prevent the entry of contaminants into the first sealing level LT1, the sealing capacity is based on the formation of a labyrinth 43 arranged in a position axially facing the interspace 26.

In particular, the second sealing level LT2 is defined by an annular lug 44 of the housing body 3 and by an annular screen 45 mounted by an interference fit on the surface 25 of the inner ring 22. The annular lug 44 forms an integral part of the folded-over edge 34 and is obtained by the folded-over edge 34 itself with the formation, on the outside of the outer edge 34, of a groove 46. The annular screen 45 is seated both with axial play and with radial play inside of the groove 46. The annular lug 44 defines the opening 35 and has an inner diameter with dimensions smaller than an outer diameter of the annular screen 45, while the presence of the two degrees of play in a radial direction and in an axial direction, namely an axial channel M1 between the annular lug 44 and the screen 45 and a radial channel M2 between the groove 46 and the annular lug 44, allows precisely a definition of the labyrinth 43. The axial and radial dimensions of the labyrinth 43 are such as to prevent any entry of contaminants inside the interspace 26.

According to the present invention, the substantial increase in the sealing capacity of the sealing device 4 is not achieved by means of an increase in the number of sealing lips making contact and the associated support screens, something which would result in an inevitable increase not only of the friction, but also in the number of components to be produced and assembled, but instead, is achieved by adopting an innovative solution such as by making use of the housing body 3 in order to provide a further sealing level without, in some cases, even the need to modify all the layout of the unit 1. In particular, with the innovative solution described here, it is possible to increase the sealing effect of the sealing device 4 against contaminants, and therefore the working life and performance of the bearing unit 1, without increasing the sliding-contact friction, and by using parts which are simple and inexpensive to produce, such as, in particular, a screen 45 made of preferably metallic material and the groove 46.

The sealing level LT2 prevents with its labyrinth sealing action, the entry of contaminants inside the interspace 26, in fact preventing also direct contact of the sealing level L1 with the contaminants and prolonging therefore also the sealing capacity of the sealing level L1. Likewise, the interspace 26 also helps improve the sealing action of the sealing level LT2, forming substantially an integral part thereof.

The combined action of the sealing levels LT2 and LT1 of the sealing device 4 helps surprisingly preserve the integrity of the rolling bearing 2.

What is claimed is:

1. A bearing unit for agricultural use comprising:
   a rolling bearing provided with:
      a first ring,
      a second ring defining together with the first ring an interspace, and
      a row of rolling elements arranged in the interspace so as to allow the relative rotation of the first and second rings;
   a housing body comprising a radial flange configured for connecting the bearing unit to a respective agricultural disc;
   a sealing device for preventing entry of contaminants into the rolling bearing, the sealing device comprising, at least on one side of the rolling bearing, a first sealing level defined by a support joined together with the first ring so as to extend at least partly inside the interspace and at least one sealing lip fixed to the support and making sliding contact with the second ring; and
   a second sealing level arranged in series with the first sealing level along an axis of symmetry of the rolling bearing, the second sealing level and defining a labyrinth for preventing the entry into the first sealing level of contaminants,
   wherein the rolling bearing is housed inside the housing body;
   wherein the second sealing level is defined by an annular lug of the housing body and by an annular screen joined together with the second ring;
   wherein the annular lug is arranged in series between the first sealing level and the annular screen along the axis of symmetry of the rolling bearing.

2. The bearing unit according to claim 1, the housing body further comprising a groove defining the annular lug,
   wherein the annular screen is located inside the groove,
   wherein the annular screen is seated both with axial play and with radial play relative to the groove.

3. A bearing unit for agricultural use comprising:
   a rolling bearing provided with:
      a first ring,
      a second ring defining together with the first ring an interspace, and
      a row of rolling elements arranged in the interspace so as to allow the relative rotation of the first and second rings;
   a housing body comprising a radial flange configured for connecting the bearing unit to a respective agricultural disc;
   a sealing device for preventing entry of contaminants into the rolling bearing, the sealing device comprising, at least on one side of the rolling bearing, a first sealing level defined by a support joined together with the first ring so as to extend at least partly inside the interspace and at least one sealing lip fixed to the support and making sliding contact with the second ring; and
   a second sealing level arranged in series with the first sealing level along an axis of symmetry of the rolling bearing, the second sealing level defining a labyrinth for preventing the entry into the first sealing level of contaminants, wherein the rolling bearing is housed inside the housing body;

wherein the second sealing level is defined by an annular lug of the housing body and by an annular screen joined together with the second ring;

wherein the housing body further comprises a groove defining the annular lug, wherein the annular screen is located inside the groove, wherein the annular screen is seated both with axial play and with radial play relative to the groove;

wherein the annular lug defines an opening inside which the second ring extends axially, wherein the annular screen is supported by the second ring on the outside of the opening and axially on the opposite side to the first sealing level.

4. The bearing unit according to claim 3, the housing body further comprising an axial shoulder for locking the first ring, wherein the annular lug extends radially towards the axis of symmetry from the axial shoulder.

* * * * *